US012118858B2

(12) United States Patent
Pitani et al.

(10) Patent No.: US 12,118,858 B2
(45) **Date of Patent: *Oct. 15, 2024**

(54) BINGO GAMING SYSTEM

(71) Applicant: LNW Gaming, Inc., Las Vegas, NV (US)

(72) Inventors: Keshav Pitani, Reno, NV (US); Qiaofeng Yang, Reno, NV (US); Brett Gottier, Reno, NV (US); Thais Jordan, Reno, NV (US); Kellen Dale, Reno, NV (US); David Welch, Logan, UT (US); Francois Ringuette, Drummondville (CA)

(73) Assignee: LNW Gaming, Inc., Las Vegas, NV (US)

(*) Notice: Subject to any disclaimer, the term of this patent is extended or adjusted under 35 U.S.C. 154(b) by 328 days.

This patent is subject to a terminal disclaimer.

(21) Appl. No.: 17/824,964

(22) Filed: May 26, 2022

(65) Prior Publication Data

US 2022/0292912 A1 Sep. 15, 2022

Related U.S. Application Data

(63) Continuation-in-part of application No. 17/667,809, filed on Feb. 9, 2022, now Pat. No. 11,605,269, which is a continuation of application No. 17/231,122, filed on Apr. 15, 2021, now Pat. No. 11,288,928.

(60) Provisional application No. 63/048,462, filed on Jul. 6, 2020.

(51) Int. Cl.
*G07F 17/32* (2006.01)
*A63F 3/06* (2006.01)

(52) U.S. Cl.
CPC .......... *G07F 17/329* (2013.01); *A63F 3/0645* (2013.01); *G07F 17/3267* (2013.01)

(58) Field of Classification Search
CPC .......... A63F 3/06; A63F 3/062; A63F 3/0645; G07F 17/32; G07F 17/3267; G07F 17/329; G07F 17/34
See application file for complete search history.

(56) References Cited

U.S. PATENT DOCUMENTS

| | | | |
|---|---|---|---|
| 5,560,610 | A | 10/1996 | Behm et al. |
| 6,524,185 | B2 | 2/2003 | Lind |
| 6,569,017 | B2 | 5/2003 | Enzminger et al. |
| 6,676,510 | B1 | 1/2004 | Bittman et al. |
| 6,755,738 | B2 | 6/2004 | Glasson et al. |
| 6,802,776 | B2 | 10/2004 | Lind et al. |
| 6,840,858 | B2 | 1/2005 | Adams |
| 6,866,584 | B2 | 3/2005 | Michaelson |
| 6,988,946 | B2 | 1/2006 | Michaelson et al. |
| 7,192,348 | B2 | 3/2007 | Brosnan et al. |
| 7,291,069 | B2 | 11/2007 | Michaelson et al. |
| 7,329,183 | B2 | 2/2008 | Michaelson et al. |

(Continued)

*Primary Examiner* — Milap Shah

(57) ABSTRACT

An electronic bingo gaming system enables the entertainment mechanisms in Class II gaming machines to mimic the look and feel of the Class III games on which those entertainment mechanisms are based. The system is constructed to minimize any wait times by players that commence a bingo game or join a bingo game already in progress. To create consistency in what players are hoping to see on their bingo cards, the bingo game may use a single interim prize pattern required to win an interim prize that is the same for all players.

23 Claims, 12 Drawing Sheets

(56) References Cited

U.S. PATENT DOCUMENTS

| | | | |
|---|---|---|---|
| 7,338,368 | B2 | 3/2008 | Lind et al. |
| 7,399,227 | B2 | 7/2008 | Michaelson et al. |
| 7,473,176 | B2 | 1/2009 | Michaelson |
| 7,479,062 | B2 | 1/2009 | Michaelson |
| 7,481,431 | B2 | 1/2009 | Miller et al. |
| 7,481,707 | B1 | 1/2009 | Luciano, Jr. et al. |
| 7,524,243 | B2 | 4/2009 | Bansemer et al. |
| 7,614,948 | B2 | 11/2009 | Saffari et al. |
| 7,628,703 | B2 | 12/2009 | Wolf et al. |
| 7,631,871 | B2 | 12/2009 | Bozeman |
| 7,670,223 | B2 | 3/2010 | Lind et al. |
| 7,695,361 | B2 | 4/2010 | Lind et al. |
| 7,708,631 | B2 | 5/2010 | Lind et al. |
| 7,708,632 | B2 | 5/2010 | Lind et al. |
| 7,708,633 | B2 | 5/2010 | Lind et al. |
| 7,708,634 | B2 | 5/2010 | Padgett |
| 7,727,064 | B1 | 6/2010 | Luciano, Jr. |
| 7,731,581 | B2 | 6/2010 | Chamberlain et al. |
| 7,753,774 | B2 | 7/2010 | Gail et al. |
| 7,766,741 | B2 | 8/2010 | Lind et al. |
| 7,771,274 | B2 | 8/2010 | Walker et al. |
| 7,775,875 | B2 | 8/2010 | Nguyen et al. |
| 7,785,189 | B2 | 8/2010 | Brosnan et al. |
| 7,794,319 | B2 | 9/2010 | Luciano, Jr. et al. |
| 7,806,762 | B2 | 10/2010 | Padgett |
| 7,833,093 | B2 | 11/2010 | Michaelson et al. |
| 7,862,423 | B2 | 1/2011 | Walker et al. |
| 7,934,987 | B2 | 5/2011 | Lind et al. |
| 7,938,720 | B2 | 5/2011 | Watkins |
| 7,946,915 | B2 | 5/2011 | Cannon |
| 7,951,004 | B2 | 5/2011 | Saffari et al. |
| 7,955,170 | B2 | 6/2011 | Gail et al. |
| 7,959,507 | B2 | 6/2011 | Cannon |
| 7,959,509 | B2 | 6/2011 | Saffari et al. |
| 7,967,675 | B1 | 6/2011 | Delaney et al. |
| 7,980,943 | B2 | 7/2011 | McGlone et al. |
| 7,985,130 | B2 | 7/2011 | Lind et al. |
| 8,025,561 | B2 | 9/2011 | Reddicks et al. |
| 8,029,352 | B2 | 10/2011 | Lind et al. |
| 8,038,534 | B1 | 10/2011 | Luciano, Jr. et al. |
| 8,057,292 | B2 | 11/2011 | Gail et al. |
| RE43,037 | E | 12/2011 | Walker et al. |
| 8,070,578 | B2 | 12/2011 | Michaelson et al. |
| 8,070,579 | B2 | 12/2011 | Bienvenue et al. |
| 8,079,902 | B2 | 12/2011 | Michaelson et al. |
| 8,087,990 | B2 | 1/2012 | Lind et al. |
| 8,118,667 | B2 | 2/2012 | Herrmann |
| 8,123,606 | B2 | 2/2012 | Hollibaugh et al. |
| 8,128,478 | B2 | 3/2012 | Meyer |
| 8,147,314 | B2 | 4/2012 | Lind et al. |
| 8,157,637 | B2 | 4/2012 | Lind et al. |
| 8,167,706 | B2 | 5/2012 | Lind et al. |
| 8,192,279 | B2 | 6/2012 | Saffari et al. |
| 8,197,326 | B2 | 6/2012 | Chamberlain et al. |
| 8,216,049 | B2 | 7/2012 | Fisk et al. |
| 8,216,050 | B2 | 7/2012 | Lind et al. |
| 8,235,787 | B2 | 8/2012 | Lind et al. |
| 8,241,103 | B2 | 8/2012 | Yarbrough et al. |
| 8,251,824 | B2 | 8/2012 | Michaelson et al. |
| 8,262,451 | B2 | 9/2012 | Powell et al. |
| 8,262,454 | B2 | 9/2012 | Lind et al. |
| 8,272,937 | B2 | 9/2012 | Michaelson et al. |
| 8,287,354 | B2 | 10/2012 | Gail et al. |
| 8,337,295 | B2 | 12/2012 | Michaelson et al. |
| 8,371,922 | B2 | 2/2013 | Padgett |
| 8,371,924 | B2 | 2/2013 | Meyer |
| 8,376,828 | B2 | 2/2013 | Lind et al. |
| 8,398,472 | B2 | 3/2013 | Bansemer et al. |
| 8,419,522 | B2 | 4/2013 | Lind et al. |
| 8,425,300 | B2 | 4/2013 | Kane et al. |
| 8,430,738 | B2 | 4/2013 | Cannon |
| 8,444,471 | B2 | 5/2013 | Reddicks et al. |
| 8,454,421 | B2 | 6/2013 | Yarbrough et al. |
| 8,469,791 | B2 | 6/2013 | Yarbrough et al. |
| 8,475,257 | B2 | 7/2013 | Bienvenue et al. |
| 8,500,538 | B2 | 8/2013 | Warner et al. |
| 8,500,539 | B2 | 8/2013 | Schulze Huynh et al. |
| 8,500,540 | B2 | 8/2013 | Lind et al. |
| 8,506,384 | B2 | 8/2013 | Coleman et al. |
| 8,523,653 | B2 | 9/2013 | Lind et al. |
| 8,540,562 | B2 | 9/2013 | Roper et al. |
| 8,562,415 | B2 | 10/2013 | Gail et al. |
| 8,574,057 | B2 | 11/2013 | Lind et al. |
| 8,579,709 | B2 | 11/2013 | Saffari et al. |
| 8,591,309 | B2 | 11/2013 | Fisk et al. |
| 8,591,325 | B2 | 11/2013 | Delaney et al. |
| 8,647,196 | B1 | 2/2014 | Colvin et al. |
| 8,647,199 | B2 | 2/2014 | Luciano, Jr. et al. |
| 8,651,928 | B2 | 2/2014 | Bansemer et al. |
| 8,668,571 | B2 | 3/2014 | Hedrick et al. |
| 8,684,832 | B2 | 4/2014 | Saffari et al. |
| 8,702,496 | B2 | 4/2014 | Baerlocher et al. |
| 8,753,188 | B2 | 6/2014 | Cannon |
| 8,764,540 | B2 | 7/2014 | Hollibaugh et al. |
| 8,808,081 | B1 | 8/2014 | Healy |
| 8,814,652 | B2 | 8/2014 | Harkins et al. |
| 8,821,248 | B2 | 9/2014 | Warner et al. |
| 8,905,835 | B2 | 12/2014 | Lind et al. |
| 8,911,288 | B2 | 12/2014 | Saffari et al. |
| 8,932,129 | B2 | 1/2015 | Powell et al. |
| 8,956,212 | B2 | 2/2015 | Yarbrough et al. |
| 8,974,285 | B2 | 3/2015 | Roper et al. |
| 9,005,005 | B2 | 4/2015 | Powell et al. |
| 9,105,146 | B2 | 8/2015 | Wolf |
| 9,105,159 | B2 | 8/2015 | Cannon |
| 9,129,488 | B2 | 9/2015 | Paulsen et al. |
| 9,147,307 | B2 | 9/2015 | Meyer |
| 9,168,452 | B2 | 10/2015 | Walker et al. |
| 9,177,443 | B2 | 11/2015 | Saffari et al. |
| 9,299,223 | B2 | 3/2016 | Guinn et al. |
| 9,384,636 | B2 | 7/2016 | Cannon |
| 9,449,468 | B2 | 9/2016 | Coleman et al. |
| 9,466,178 | B2 | 10/2016 | Safari et al. |
| 9,536,392 | B1 | 1/2017 | Luciano, Jr. et al. |
| 9,569,932 | B2 | 2/2017 | Nicely et al. |
| 9,721,434 | B2 | 8/2017 | Coleman et al. |
| 9,922,489 | B2 | 3/2018 | Michaelson et al. |
| 10,002,494 | B2 | 6/2018 | Saffari et al. |
| 10,008,071 | B2 | 6/2018 | Powell et al. |
| 10,043,339 | B2 | 8/2018 | Walker et al. |
| 10,127,773 | B2 | 11/2018 | Cannon |
| 10,297,110 | B2 | 5/2019 | Reddicks et al. |
| 10,565,826 | B2 | 2/2020 | Wolf et al. |
| 10,614,669 | B2 | 4/2020 | Selegue |
| 10,692,331 | B2 | 6/2020 | Wolf et al. |
| 10,762,747 | B2 | 9/2020 | Brown |
| 10,896,581 | B2 | 1/2021 | Luciano |
| 11,288,928 | B2 | 3/2022 | Welch et al. |
| 11,605,269 | B2 * | 3/2023 | Welch .................. G07F 17/329 |
| 2004/0152508 | A1 | 8/2004 | Lind et al. |
| 2004/0235555 | A1 | 11/2004 | Yarbrough et al. |
| 2005/0059471 | A1 | 3/2005 | Cannon |
| 2005/0119042 | A1 | 6/2005 | Chamberlain et al. |
| 2005/0164772 | A1 | 7/2005 | Lind et al. |
| 2005/0261050 | A1 | 11/2005 | Waters |
| 2007/0043584 | A1 | 2/2007 | Waters |
| 2007/0257430 | A1 | 11/2007 | Hardy et al. |
| 2009/0318231 | A1 | 12/2009 | Lange |
| 2014/0256393 | A1 | 9/2014 | Navarrete |

* cited by examiner

| B | I | N | G | O |
|---|---|---|---|---|
| 67 | 33 | 5 | 36 | 11 |
| 18 | 58 | 75 | 35 | 23 |
| 55 | 6 | 16 | 53 | 47 |
| 40 | 41 | 66 | 1 | 20 |
| 10 | 54 | 25 | 63 | 65 |

100

BINGO GAMING SYSTEM

This application is a continuation-in-part of U.S. patent application Ser. No. 17/667,809, filed Feb. 9, 2022, which is a continuation of U.S. patent application Ser. No. 17/231,122, filed Apr. 15, 2021, now U.S. Pat. No. 11,288,928, which claims the benefit of priority to U.S. Provisional Application No. 63/048,462, filed Jul. 6, 2020, the contents of which are hereby incorporated by reference in their entireties.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2020-22, SG Gaming, Inc.

FIELD OF THE INVENTION

The present invention relates generally to gaming systems and methods and, more particularly, relates to a bingo gaming system and method that operates automated bingo games.

BACKGROUND OF THE INVENTION

For Class II purposes, United States code describes bingo as a "game of chance . . . with cards bearing numbers or designations . . . in which the holder of the card covers such numbers or designations when objects, similarly numbered or designated, are drawn or electronically determined, and . . . the game is won by the first person covering a previously designated arrangement of numbers or designations on such cards." 25 USC § 2703.

Traditional bingo games use paper bingo cards with either manual or automated ball-draw systems. Players buy a bingo card or cards, and when the minimal number of players as determined by the bingo hall or casino are ready to play (can be on the order of twenty players per game, but varies widely), the current bingo session is considered closed; players subsequently purchasing cards will play in future game sessions. Those having purchased cards for the current bingo game session will participate in the game about to start. Participating players watch as a sequence of bingo balls is drawn. The players daub (mark) their cards in squares or spaces corresponding to the balls drawn (alternatively, an electronic card version may be auto-daubed). After a player daubs a pre-specified winning pattern on their card(s) and declares they have won by calling out "bingo," the current game is typically considered over.

Many variants of bingo exist, including the ability to have multiple winners in a single bingo game and the ability for players to participate in progressive jackpots. An example of a bingo game with multiple winners is to provide a first prize to the first player to cover five squares in a row, column, or diagonally and to provide a second prize to the first player to complete an "X" pattern consisting of two diagonals.

If a player misses declaring a winning pattern on a card by failing to call out "bingo," the ball draws continue until someone proclaims bingo on a subsequent ball. Further, although there is one (or sometimes more than one) card pattern(s) designated as the game winning patterns (such as filling in a row or column), there are typically other predesignated patterns that enable a player to win additional prizes. Examples include "corners" (i.e., filling in each of the four outer corners of a bingo card), "boxes" (i.e., filling in a 2×2 box anywhere on the card), and blackout (i.e., covering all the entire card's spaces after using a specified number of drawn balls less than 75). After play stops, players with winning cards are paid. The next game then begins with players enrolling for that game.

Pursuant to IGRA (25 USC §§ 2701-2721), games for Class II markets have prizes which are solely determined through the outcome of a bingo game. Once the prize is determined, the presentation of that prize to the player may come through some form of "entertainment" mechanism that may or may not be related to bingo. One popular entertainment mechanism is to show the bingo game prize amount on an electronic gaming machine through animations, videos, lights and sounds that mimic the look and feel of a video slot machine. The reels of the video slot machine are spun and stopped to land symbols in an array in visual association with one or more win lines or ways. The landing positions of the symbols represent a payout that is equivalent to the amount won on the bingo card. In this manner, the bingo card winnings/prizes are reverse mapped to spinning reel outcomes. The entertainment mechanism may be "themed" so that players have a choice of the entertainment presented to them after their bingo game play has completed. In addition, different themes may present different bingo card purchase options and different availability of prize values which the player may win.

Players who play at both bingo halls and in Nevada-style casinos have a "feel" for the familiar Class III games being mimicked, where "feel" means developing an intuitive familiarity with the frequency of game events including the occurrence of pay events and the typical payout amounts. Thus, to have a realistic feel to players of both types of machines, the best entertainment mechanisms are those that truly mimic the look and feel of how the actual Class III game plays, not just the graphical characteristics of the game.

Existing Class II bingo gaming systems that operate concurrent, multi-player, multi-stage bingo games have several shortcomings.

50% Hit Frequency. Some bingo gaming systems and their underlying data tables require that the bingo game produce a winner for 50% of the players participating in the bingo game. This directly translates to a 50% hit frequency for the underlying entertainment mechanism and means that any Class III game to be mimicked with an entertainment mechanism in Class II must be "translated" from its native hit frequency to the bingo 50% requirement. Though this translation can occur automatically in game development tool chains, the translation changes the "feel" of the underlying Class III game.

Pattern Overload. Some bingo gaming systems use numerous (e.g., hundreds) patterns on a bingo card to define winning patterns, which can lead to player confusion or overload as to what the player is looking for when playing bingo.

Bingo Ties. Some bingo gaming systems and their underlying data tables permit two or more players in the bingo game to tie for a bingo win. This bingo game tie will lead to the division of the players' win amounts by the number of players tied for the win. Ties of this nature can lead to bingo prizes that cannot be exactly "reverse mapped" to an entertainment mechanism outcome. This can lead to fractional credit win amounts. The division of prizes and potential fractional credit win amounts can also adversely affect the "feel" of the underlying Class III game.

Bingo Game Play Time. Some bingo gaming systems require at least two concurrent players to start a bingo game within some common time frame. The bingo game is then carried out between the electronic gaming machines and a bingo game manager over the course of several (e.g., five) network messages. One of these messages involves a potential delay (e.g., three seconds) for a bingo player to "daub" their bingo card. Increasing the number of players above two introduces additional messages and another potential delay (e.g., three more seconds). This delay can be "felt" by other participants in the bingo game and therefore affects the perceived speed of the game play.

Concurrent Players. As noted above, some bingo gaming systems require a minimum of two concurrent players to start a bingo game within some common time frame. In the case where one player attempts to start a game and no other players are currently available, the player starting the game may be presented with a "Waiting for Additional Players" message. This message may be displayed to the player until another player attempts to start a game, at which time both players will be placed in the same bingo game by the bingo game manager. The concurrent players issue also increases the effective game play time.

A need therefore exists for a bingo gaming system and method that overcomes one or more of the foregoing shortcomings.

SUMMARY OF THE INVENTION

According to an embodiment of the present invention, an electronic bingo gaming system operates a bingo game including a single game ending pattern and a single interim prize pattern. The interim prize pattern may be identical to the game ending pattern and is a common pattern of spots on all bingo cards purchased in the bingo game. The system comprises a bingo game manager in communication with a plurality of electronic gaming machines. Each gaming machine includes a value input device and a value output device. The value input device is configured to accept a first physical item associated with a first monetary value to establish a credit balance. The value output device is configured to dispense a second physical item associated with a second monetary value to cash out the credit balance. The plurality of gaming machines include one or more purchasing machines configured to receive an input indicative of a purchase of a virtual bingo card. The purchase is drawn from the credit balance at the respective purchasing machine.

The bingo game manager is configured to randomly generate a common ball draw comprising a random sequence of numbered virtual balls, randomly generate the purchased bingo cards such that none of the bingo cards are duplicates of each other, and deliver the common ball draw and the respective bingo card in a single message to each of the one or more purchasing machines.

In response to the interim prize pattern being achieved, at any of the one or more purchasing machines, on the respective bingo card within 'M' number of balls of the ball draw, the purchasing machine is configured to generate a score equal to a mathematical product of indices of the balls within the common ball draw that formed the interim prize pattern and animate a non-bingo entertainment outcome based on the score. In other embodiments, the score is equal to, or derived from, a bit vector in which bits corresponding to the indices of the balls within the common draw that formed the interim prize pattern are set to a value.

In response to the game ending pattern being achieved, at any of the one or more purchasing machines, on the respective bingo card within 'N' number of balls of the ball draw, the bingo game manager is configured to end the bingo game. In response to the game ending pattern not being achieved, at the one or more purchasing machines, on the respective bingo cards within the 'N" number of balls of the ball draw, the bingo game manager is configured to enable any of the plurality of gaming machines to join the bingo game in progress by receiving an input indicative of a purchase of a new bingo card at the respective gaming machine.

Additional aspects of the invention will be apparent to those of ordinary skill in the art in view of the detailed description of various embodiments, which is made with reference to the drawings, a brief description of which is provided below.

DETAILED DESCRIPTION

Figure 1:
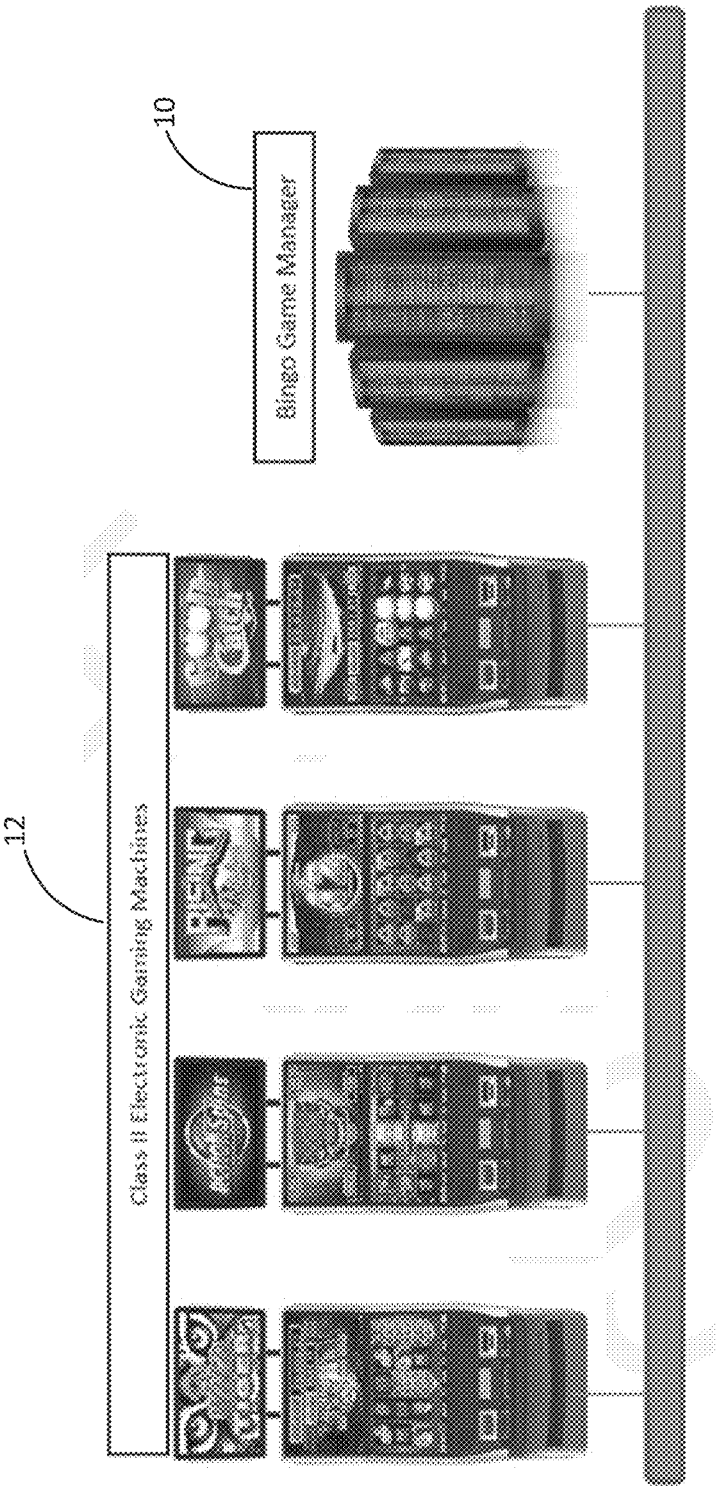
FIG. 1 is a block diagram of a bingo game system, including a bingo game manager and electronic gaming machines, according to an embodiment of the present invention.

While the invention is susceptible to various modifications and alternative forms, specific embodiments are shown by way of example in the drawings and described in detail herein. It should be understood, however, that the invention is not intended to be limited to the particular forms disclosed. Rather, the invention is to cover all modifications, equivalents, and alternatives falling within the spirit and scope of the invention as defined by the appended claims. For purposes of the detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

Referring to FIG. 1, a bingo gaming system includes a bingo game manager 10 that conducts a multi-player bingo game played via a plurality of Class II electronic gaming machines 12. The bingo game manager 10 is a centralized computer system whose job is to manage one or more bingo games at a Class II gaming site/establishment or across multiple Class II gaming sites. This computer system includes, in various aspects, one or more servers, controllers, communications hardware, or a variety of other interfaced systems or components, in any combination. The bingo game manager 10 generates virtual/electronic bingo cards such that duplicates of the same card are not "sold" for any common ball draw. In other words, the same bingo card does not appear twice in any bingo game, where a bingo game is defined by the balls being drawn. The bingo game manager 10 also manages a random drawing of virtual/electronic bingo balls when two or more players start a bingo game. To perform the random drawing, the bingo game manager 10 executes random-number-generator (RNG) programming to generate one or more pseudo-random numbers. The RNG cannot be carried out manually by a human and is integral to operating the bingo game. The bingo game manager 10 delivers the virtual balls and virtual bingo cards to gaming machines 12 that join the game. As described below, the gaming machine 12 evaluates the delivered virtual balls and the virtual bingo card purchased at the machine to determine if the player achieved an interim prize pattern within a predetermined number of balls. If the player achieved the interim prize pattern within 'M' balls, the gaming machine 12 generates a score that is mapped, by cross-reference with data tables described below, to a prize represented by an entertainment outcome. The gaming machine 12 then presents the entertainment outcome on its display(s) via entertaining animations.

Figure 2:
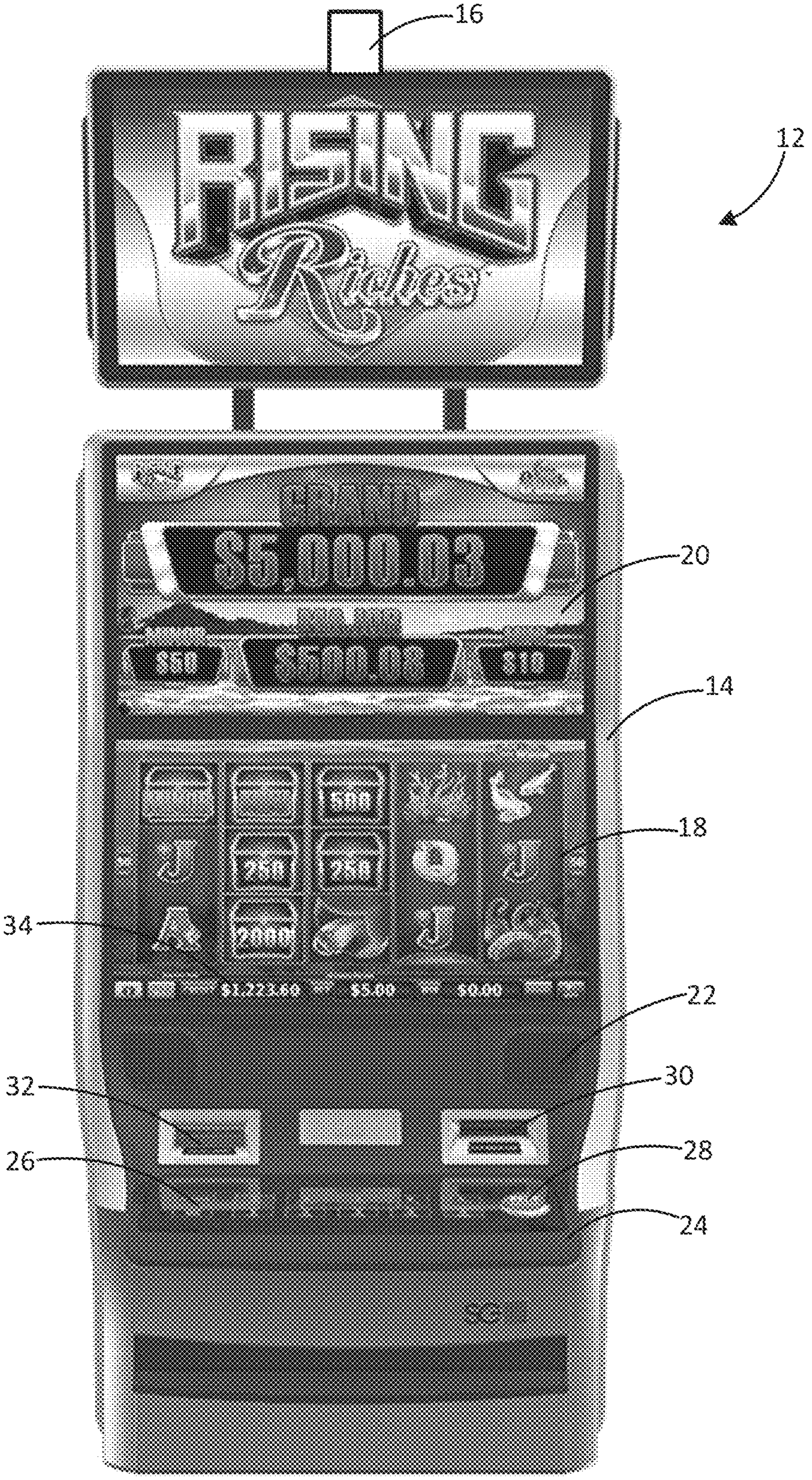
FIG. 2 is a front view of an electronic gaming machine used in the bingo game system.

Referring to FIG. 2, the gaming machine 12 may be any type of gaming terminal or machine and may have varying structures and methods of operation. For example, in some aspects, the gaming machine 12 is an electronic gaming terminal configured to play a Class II bingo game and present a bingo score through some form of "entertainment" mechanism that may or may not be related to bingo. The entertainment mechanism may, for example, be in the form of a non-bingo game such as slots, keno, poker, blackjack, roulette, craps, etc. In the illustrated embodiment, the entertainment mechanism is in the form of a video slot game including a plurality of simulated symbol-bearing reels 36 that are rotated and stopped to land symbols on the reels in a symbol array or matrix in visual association with win lines or ways. The pay table for the slot game may, for example, include "line pays," "scatter pays," and bonus triggers that trigger bonus games. Line pays occur when a predetermined type and number of symbols appear along an activated line, typically in a particular order such as left to right, right to left, top to bottom, bottom to top, etc. Scatter pays occur when a predetermined type and number of symbols appear anywhere in the displayed array without regard to position or lines. The gaming machine 12 may take any suitable structure, such as a floor-standing, stationary model as shown, bartop model, workstation-type console model, etc. The gaming machine 12 may be primarily dedicated for use in playing bingo games with attendant entertainment mechanisms.

The gaming machine 12 comprises a gaming cabinet 14 that securely houses various input devices, output devices, input/output devices, internal electronic/electromechanical components, and wiring. The cabinet 14 includes exterior walls, interior walls and shelves for mounting the internal components and managing the wiring, and one or more front doors that are locked and require a physical or electronic key to gain access to the interior compartment of the cabinet 14 behind the locked door. A notification mechanism 16, such as a candle or tower light, is mounted to the top of the cabinet 14 and flashes to alert an attendant that change is needed, a hand pay is requested, or there is a potential problem with the gaming machine 12.

Input devices, output devices, and input/output devices are disposed on, and securely coupled to, the cabinet 14. By way of example, the output devices include a primary display 18, a secondary display 20, and one or more audio speakers 22. The primary display 18 or the secondary display 20 may be a mechanical-reel display device, a video display device, or a combination thereof in which a transmissive video display is disposed in front of the mechanical-reel display to portray a video image superimposed upon the mechanical-reel display. The displays variously display information associated with bingo games, entertainment mechanisms, progressives, advertisements, services, premium entertainment, text messaging, emails, alerts, announcements, broadcast information, subscription information, etc. appropriate to the particular mode(s) of operation of the gaming machine 12. The gaming machine 12 includes an input ledge or deck 24 disposed below the primary display 18 and extending forwardly towards a player positioned in front of the machine. The input deck 24 bears a narrow video button panel 26 and one or more electromechanical push-buttons 28 adjacent to the panel 26. The video button panel 26 may be an iDeck™ panel offered on gaming machines manufactured by the assignee, SG Gaming, Inc., of the present invention. The primary display 18, the secondary display 20, and the video button panel 26 may be outfitted with respective touch screens to enable a player to make inputs via touch keys depicted on the underlying displays. The gaming machine 12 includes a bill/ticket acceptor 30, a ticket dispenser 32, and player-accessible ports (e.g., audio output jack for headphones, video headset jack, USB port, wireless transmitter/receiver, etc.) disposed below the primary display 18 and above the input deck 24. It should be understood that numerous other peripheral devices and other elements exist and are readily utilizable in any number of combinations to create various forms of a gaming machine 12 in accord with the present concepts.

The player input devices, such as the touch screens (in front of the various displays), the push-button(s) 28, a mouse, a joystick, a gesture-sensing device, a voice-recognition device, and a virtual-input device, accept player inputs and transform the player inputs to electronic data signals indicative of the player inputs, which correspond to an enabled feature for such inputs at a time of activation (e.g., pressing a "Max Bet" push-button or soft touch key to indicate a player's desire to place a maximum wager to play the wagering game). The inputs, once transformed into electronic data signals, are output to game-logic circuitry for processing. The electronic data signals are selected from a group consisting essentially of an electrical current, an electrical voltage, an electrical charge, an optical signal, an optical element, a magnetic signal, and a magnetic element.

The gaming machine 12 includes one or more value input/payment devices and value output/payout devices. In order to deposit cash or credits onto the gaming machine 12, the value input devices are configured to detect a physical item associated with a monetary value that establishes a credit balance on a credit meter such as the "credit" meter 34. The physical item may, for example, be currency bills, coins, tickets, vouchers, coupons, cards, and/or computer-readable storage mediums. The deposited cash or credits are used to fund wagers placed on the bingo game played via the gaming machine 12. Examples of value input devices include, but are not limited to, a coin acceptor, the bill/ticket acceptor 30, a card reader/writer, a wireless communication interface for reading cash or credit data from a nearby mobile device, and a network interface for withdrawing cash or credits from a remote account via an electronic funds transfer. In response to a cashout input that initiates a payout from the credit balance on the "credit" meter 34, the value output devices are used to dispense cash or credits from the gaming machine 12. The credits may be exchanged for cash at, for example, a cashier or redemption station. Examples of value output devices include, but are not limited to, a coin hopper for dispensing coins or tokens, a bill dispenser, a card reader/writer, the ticket dispenser 32 for printing tickets redeemable for cash or credits, a wireless communication interface for transmitting cash or credit data to a nearby mobile device, and a network interface for depositing cash or credits to a remote account via an electronic funds transfer.

Figure 3:
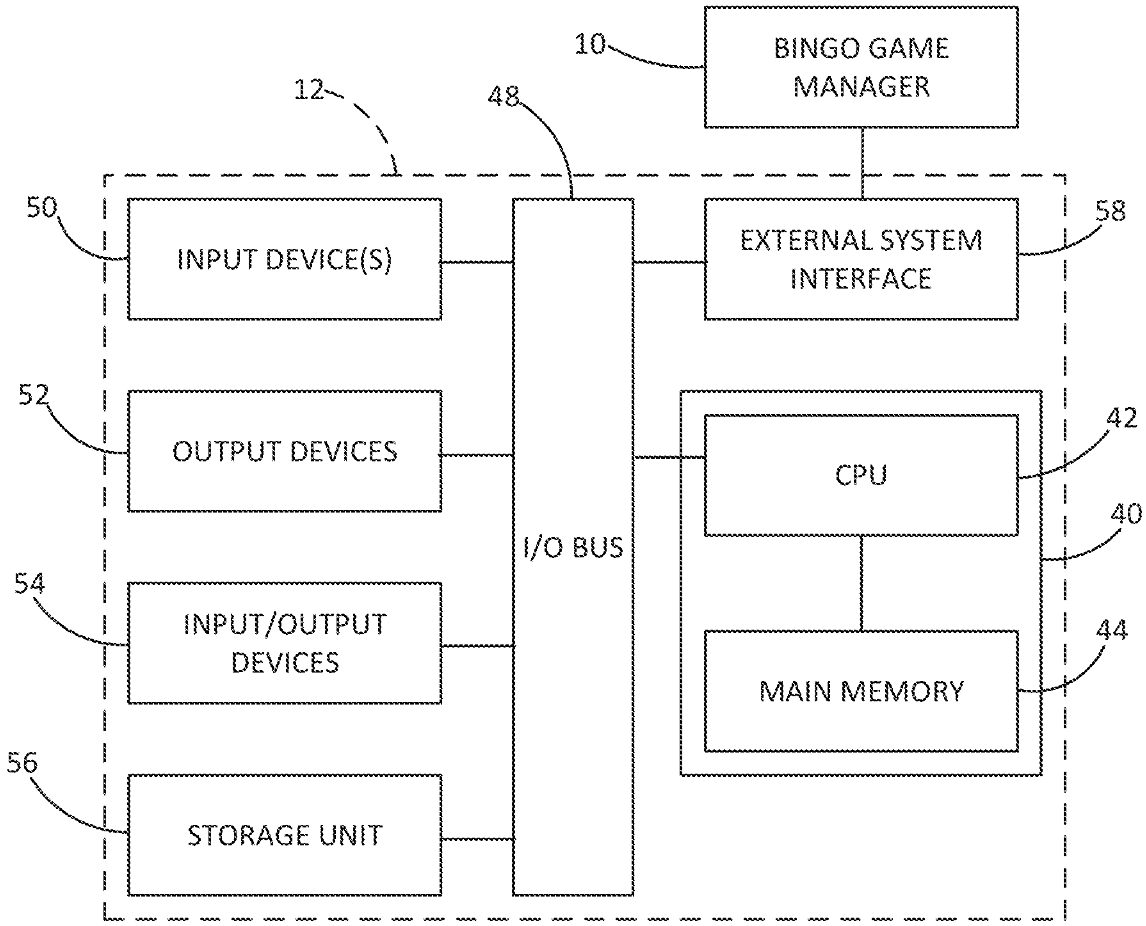
FIG. 3 is a block diagram of the architecture of the bingo game system, including the architecture of an electronic gaming machine used in the bingo game system.

Referring to FIG. 3, there is shown the architecture of the bingo game system, including the architecture of an electronic gaming machine 12 used in the bingo game system. The gaming machine 12 includes game-logic circuitry 40 securely housed within a locked box inside the gaming cabinet 14 (see FIG. 2). The game-logic circuitry 40 includes a central processing unit (CPU) 42 connected to a main memory 44 that comprises one or more memory devices. The CPU 42 includes any suitable processor(s), such as those made by Intel and AMD. By way of example, the CPU 42 includes a plurality of microprocessors including a master processor, a slave processor, and a secondary or parallel processor. Game-logic circuitry 40, as used herein, comprises any combination of hardware, software, or firmware disposed in or outside of the gaming machine 12 that is configured to communicate with or control the transfer of data between the gaming machine 12 and a bus, another computer, processor, device, service, or network. The game-logic circuitry 40, and more specifically the CPU 42, comprises one or more controllers or processors and such one or more controllers or processors need not be disposed proximal to one another and may be located in different devices or in different locations. The game-logic circuitry 40, and more specifically the main memory 44, comprises one or more memory devices which need not be disposed proximal to one another and may be located in different devices or in different locations. The game-logic circuitry 40 and bingo game manager 10 are operable to execute the various gaming methods and other processes disclosed herein.

The game-logic circuitry 40 is also connected to an input/output (I/O) bus 48, which can include any suitable bus technologies, such as an AGTL+frontside bus and a PCI backside bus. The I/O bus 48 is connected to various input devices 50, output devices 52, and input/output devices 54 such as those discussed above in connection with FIG. 2. The I/O bus 48 is also connected to a storage unit 56 and an external-system interface 58, which is connected to the bingo game manager 10.

The gaming machine 12 may include additional peripheral devices or more than one of each component shown in FIGS. 2 and 3. Any component of the gaming-machine architecture includes hardware, firmware, or tangible machine-readable storage media including instructions for performing the operations described herein. Machine-readable storage media includes any mechanism that stores information and provides the information in a form readable by a machine (e.g., gaming terminal, computer, etc.). For example, machine-readable storage media includes read only memory (ROM), random access memory (RAM), non-volatile random access memory (NVRAM), magnetic-disk storage media, optical storage media, flash memory, etc.

The bingo game manager 10 and the gaming machine 12 constitute gaming equipment that meets the hardware and software requirements for fairness, security, and predictability as established by a gaming control board or commission (e.g., National Indian Gaming Commission) charged with regulating Class II games. Prior to commercial deployment, the gaming equipment must satisfy minimum technical standards and obtain regulatory approval from the applicable gaming control board or commission. As can be seen from the description herein, the gaming equipment may be implemented with hardware and software architectures, circuitry, and other special features that differentiate them from general-purpose computers (e.g., desktop PCs, laptops, and tablets). Furthermore, the gaming equipment stores programming and data that is verified by a trusted authentication program(s) prior to game execution. The authentication program generates a live authentication code (e.g., digital signature or hash) from memory contents and compares it to a trusted code. If the codes match, authentication is deemed a success and the game is permitted to execute. If, however, the codes do not match, authentication is deemed a failure that must be corrected prior to game execution. Without this predictable and repeatable authentication, the gaming equipment is not allowed to perform or execute the programming in a regulatory-approved manner and is therefore unacceptable for commercial use. In other words, through the use of the authentication program, the gaming equipment facilitates operation of the game in a way that a person making manual calculations or computations could not.

Bingo Card Layout

Figures 4, 5:
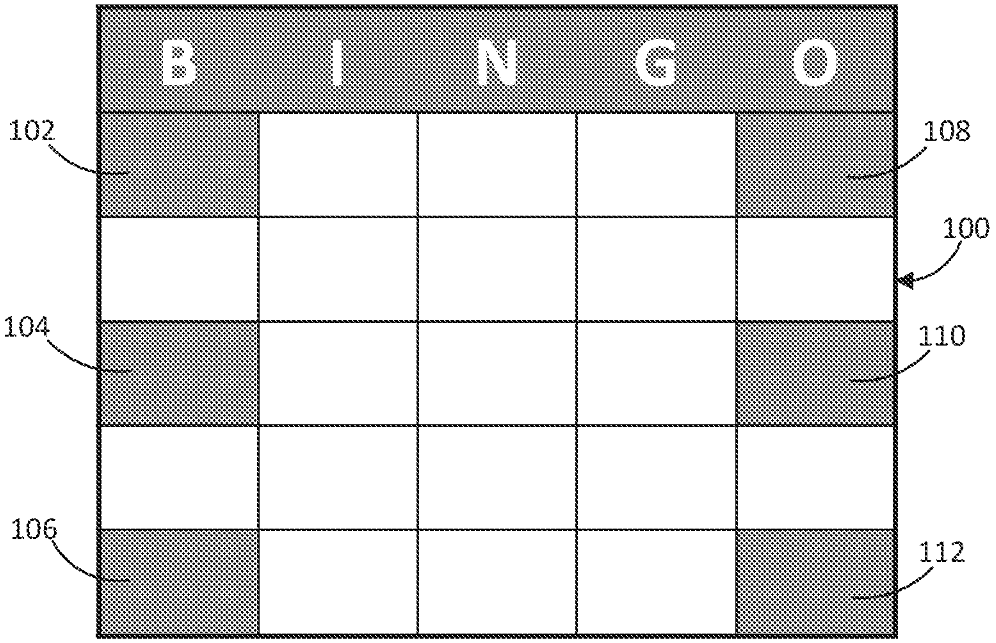
FIG. 4 is an example of a virtual bingo card generated by the bingo game manager.
FIG. 5 is an example of a game ending pattern used for bingo games managed by the bingo game manager.

Referring to FIG. 4, the bingo game manager 10 manages a bingo game utilizing virtual bingo cards such as a bingo card 100. The bingo card has a traditional arrangement of 25 numbers in a 5×5 grid with no free space. For each bingo card generated by the bingo game manager 10, each of the 25 card "spots" is randomly assigned a numerical value between 1 and 75 (inclusive). Any number may appear in any location on the card, and no single number may appear more than once on the card. In any bingo game, no two bingo cards are the same. When a player at a gaming machine 12 purchases a bingo card and joins a bingo game, the bingo card may be displayed on the video button panel 26, the primary display 18, or the secondary display 20 of the gaming machine 12 (see FIG. 2). In another embodiment, the bingo card has a different arrangement and/or different number of spots, and the bingo game uses more or less than 75 balls and/or designations (e.g., A, B, C, D, etc.) other than numbers on the balls.

Commencement of a Bingo Game

The commencement of a bingo game occurs when two or more players have purchased respective bingo cards within some common time frame (typically less than a second) at one of the "buy-in" options provided by their respective gaming machines 12. Therefore, when starting a bingo game, the bingo game manager 10 waits for two or more players to begin game play within the common time frame. The bingo card purchase is an indication that the player wishes to play a bingo game. During purchase of the bingo card, the bingo game manager 10 ensures that no duplicate cards are sold for any common draw. The bingo game manager 10 then randomly shuffles the numbers between 1 and 75 (inclusive) and simultaneously delivers those numbers in the shuffled order in one message to each player's gaming machine. This act is referred to as the bingo game "ball draw."

Bingo Game Ending Pattern and Conditions

The bingo game is won by the first player covering a previously designated arrangement of numbers or designations on their bingo card. This arrangement is referred to as the "game ending pattern." The bingo game uses a single (one and only one) game ending pattern. FIG. 5 depicts an example of a game ending pattern that may be used in the bingo game. In this example, the game ending pattern comprises three spots 102, 104, and 106 in the first column and three spots 108, 110, and 112 in the fifth column of a bingo card. There is nothing particularly special about the bingo card pattern used for the game ending pattern other than its theoretical probabilities of occurring at various ball draw counts. A more frequent game ending pattern (i.e., hitting the pattern at higher ball draw counts) will dictate the frequency of commencing a bingo game versus joining a bingo game. In a preferred embodiment, any arrangement of six spots on the bingo card may define the game ending pattern.

In addition to this game ending pattern, the bingo game manager 10 defines a condition in which the bingo game is won and concluded when the game ending pattern is achieved within the first 'N' balls of the 75 balls received. The value of 'N' is configurable. Once a value of 'N' is selected, it applies to all players in a bingo game and does not change once a bingo game has started. The game ending pattern and the value of 'N' are made known to the player at each gaming machine 12 prior to the player's participation in any bingo game. Therefore, the bingo game is "complete" when a player covers the game ending pattern within the first 'N' balls of the bingo ball draw. In one embodiment, it should be noted that the game ending pattern itself does not necessarily pay any monetary prize. This fact is made known to the player at each gaming machine 12 prior to the player's participation in any bingo game.

After the bingo game commences with two or more players within the common time frame, the bingo game manager 10 determines, on its own, whether any of the players achieved the game ending pattern. If no player achieved the game ending pattern, then the bingo game manager 10 allows additional players to join the bingo game that is currently in progress. If, however, one or more of the players achieved the game ending pattern, the bingo game manager 10 ends the bingo game and the next bingo game request it receives from a player will commence a new bingo game.

Joining an In-Progress Bingo Game

As noted above, if the bingo game manager 10 is hosting a bingo game in which no player achieved the game ending pattern, then new players, including players that may have already participated in the bingo game, may join the bingo game that is in progress by buying a new bingo card at their gaming machines 12. The bingo game manager 10 then delivers the 75 balls for the bingo game to those new players and performs the game ending pattern check. If no game ending pattern has been achieved, the bingo game remains "alive" and allows new players to join.

Interim Prize Pattern and Conditions

National Indian Gaming Commission rules allow for interim prizes and simultaneous winners. Accordingly, in addition to achieving the game ending pattern within the first 'N' balls as described above, interim prizes are available to players if they achieve the same pattern defined for ending the bingo game, but within the first 'M' balls of the 75 balls received. The value of 'M' is also referred to herein as the "ball draw cutoff." Although the interim prizes may vary from player-to-player (theme-to-theme), the interim prize pattern required to win an interim prize is the same for all players and is the same as the game ending pattern. This creates consistency in what the player is hoping to see. The bingo game uses a single (one and only one) interim prize pattern. Although the interim prize pattern is the same as the game ending pattern, and remains consistent from player-to-player (theme-to-theme), the number of balls 'M' in which the player has to achieve the interim pattern may change from theme-to-theme, and even from bet-to-bet within a theme. That is, the value of 'M' may be the same for each player participating in the bingo game, or it may be different.

Figure 6:
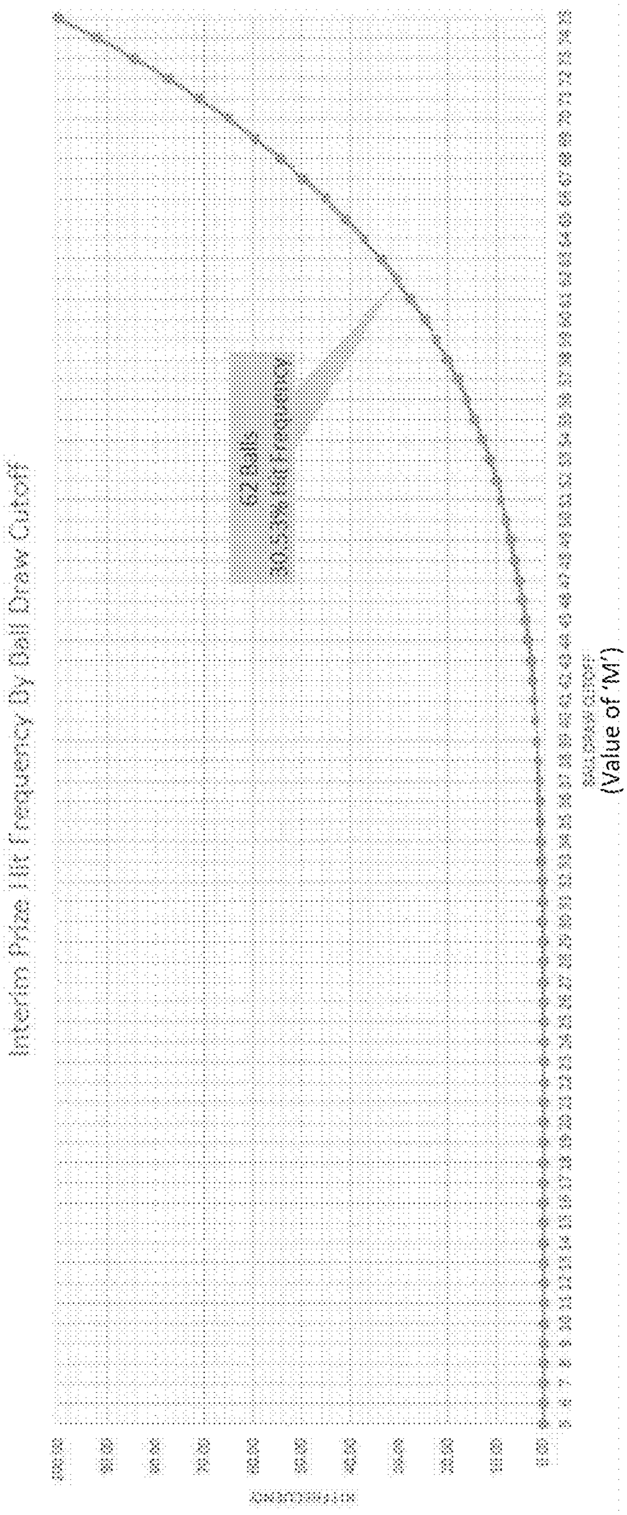
FIG. 6 is a graph showing the effect that a change in a ball draw cutoff value of 'M' has on the hit frequency for an interim pattern used in the bingo game system.

The ball draw cutoff value of 'M' is selected on a theme-by-theme basis to closely match the native hit frequency of the Class III theme on which the entertainment mechanism in Class II is based. Referring to FIG. 6, the illustrated graph shows the effect that a change in the value of 'M' has on the hit frequency for the interim pattern. Using this data, one might choose to have a theme, whose native hit frequency in Class III is 30%, map to a bingo game with an interim prize ball draw cutoff value of 'M' of 62. This would mean that a player achieving the interim pattern within 62 balls would be awarded an interim prize. A different theme with a different native hit frequency in Class III of 60% may then have a different ball draw cutoff value of 'M' of 69. The value of 'M' for each player does not change once a bingo game has started. The value of 'M' is made known to the player at the gaming machine 12 prior to the player's participation in any bingo game. There is no implied relationship between the value of 'N' for the bingo "game ending pattern" and the value of 'M' used for determining a player's interim prize.

Because the game ending pattern conditions are not always guaranteed to be achieved by the first two or more players commencing the bingo game, it is possible for players to join a bingo game that has already been started, but has not yet had any player achieve the game ending pattern conditions (i.e., game ending pattern within the first 'N' balls of the 75 balls received). To join a bingo game that is already in progress, a player (including any player that may have previously participated in the bingo game) may purchase a bingo card from the bingo game manager 10. The player then receives the 75 balls from the bingo game manager 10 for a bingo game that is currently in progress. This player may or may not achieve the game ending pattern conditions (i.e., game ending pattern within the first 'N' balls of the 75 balls received). Likewise, the player may or may not achieve any interim prize pattern conditions (i.e., interim prize pattern within the first 'M' balls of the 75 balls received).

In another embodiment, the interim prize pattern and the game ending pattern has the same number of spots but in a different arrangement. In yet another embodiment, the interim prize pattern has a different number of spots than the game ending pattern. In this case, the number of spots in the interim prize pattern is preferably six in order to balance scores (see below) having low enough probabilities to map to entertainment outcomes (e.g., slot outcomes) with the size of data tables that need to be stored in gaming machine memory. The number of spots in the game ending pattern, in conjunction with the number of balls 'N' in which the game ending pattern must be achieved, drives the probability of achieving the game ending pattern and, by extension, the length of time of a bingo game. There are no data tables stored in relation to the game ending pattern. Therefore, increasing the number of spots in the game ending pattern is not as prohibitive as it is for the interim prize pattern. Decreasing the number of spots in the game ending pattern is also quite viable, as long as the probability of the game ending pattern occurring still fits within the desires of the bingo system developer.

Bingo Card Evaluation and Interim Prize Amount Determination

Each player purchasing a bingo card at a gaming machine 12 and receiving the 75 bingo balls has their card "evaluated" automatically by the gaming machine 12 on which they are playing, after all 75 balls have been received. Each player within the bingo game achieving the interim prize pattern conditions applicable to their buy-in option is awarded a prize which is determined by a combination of their buy-in option and any interim prize pattern's "score." The gaming machine 12 calculates the score by taking the mathematical product of the indices of the balls within the ball draw that formed the interim prize pattern within 'M' balls. Each possible interim pattern score has a theoretically known probability of occurring. The gaming machine 12 maps these individual interim pattern probabilities (or groups of probabilities) to specific prizes/outcomes from the underlying theme's math using the probability of those specific prizes. With a scoring approach, the gaming machine 12 is able to immediately determine, not only whether it achieved the interim pattern within the designated ball draw cutoff 'M', but also the interim prize amount without any additional interaction with the bingo game manager 10.

As stated above, the ball draw cutoff value of 'M' is selected to closely match the native hit frequency of the Class III theme on which the bingo entertainment mechanism in Class II is based. From the graph in FIG. 6, one can see that hit frequencies in the range of near 0% to 100% can be achieved with ball draw cutoff values of 'M' from 6 to 75. Each distinct ball draw cutoff value may then have a set of theoretical calculations performed on it to determine every possible bingo score that can be generated with the interim prize pattern and the associated ball draw cutoff value. The results of these 70 sets of theoretical calculations results in a set of score probability tables which contain every possible bingo score at every possible interim ball draw cutoff value, wherein each score has a theoretically known probability that can be mapped to prizes/outcomes from the entertainment mechanism.

Figure 7:
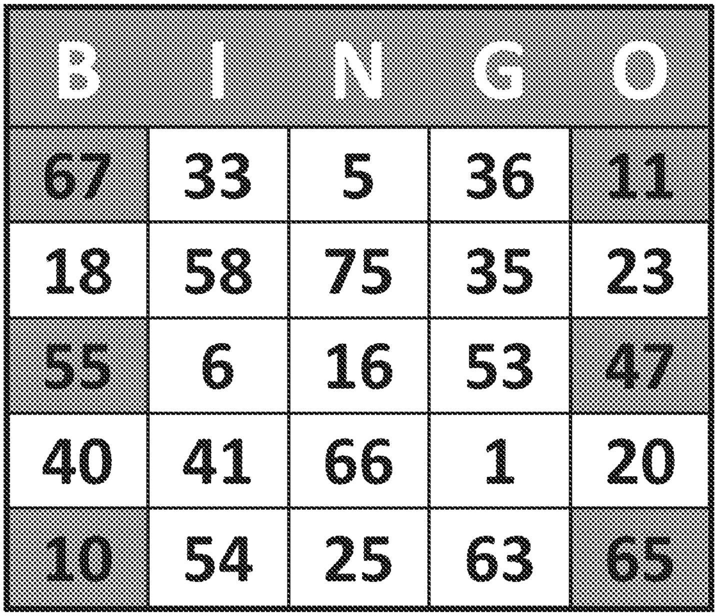
FIG. 7 is an example of a virtual bingo card generated by the bingo game manager and highlighting the spots representing the game ending pattern.
Figure 8:
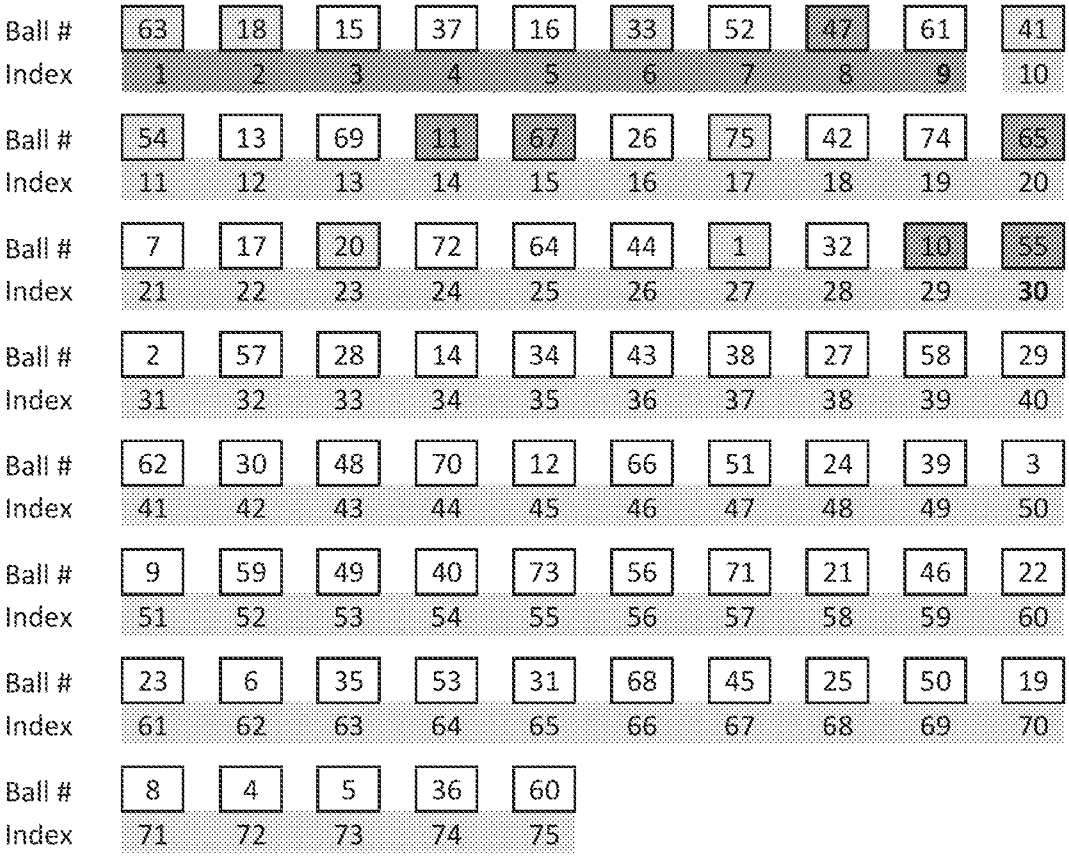
FIG. 8 is a diagram showing an example of a sequence of 75 balls randomly drawn by the bingo game manager for a bingo game.

As an example, a bingo game may have an 'N' value of 9 and an 'M' value of 30. For the bingo game, a player purchases the bingo card in FIG. 7 at a gaming machine 12, and the bingo game manager 10 randomly draws the 75 balls in the sequence shown in FIG. 8, wherein:

Balls shown with an Index value in the range of 1 through 9 are balls which are within the game ending pattern ball count of 9 ('N'=9).

Balls shown with an Index value in the range of 1 through 30 are balls which are within the interim prize pattern ball count of 30 ('M'=30)

Balls shown with an Index value in the range of 31 through 75 are balls which are outside the interim prize pattern ball count of 30 ('M'=30).

Balls at respective Index values 1, 2, 6, 8, 10, 11, 14, 15, 17, 20, 23, 27, 29, and 30 are balls which appear on the player's bingo card within the interim prize pattern ball count of 30 ('M'=30).

Balls at respective Index values 8, 14, 15, 20, 29, and 30 are balls which match the interim prize pattern and appear within the interim prize pattern ball count of 30 ('M'=30).

Figure 9:
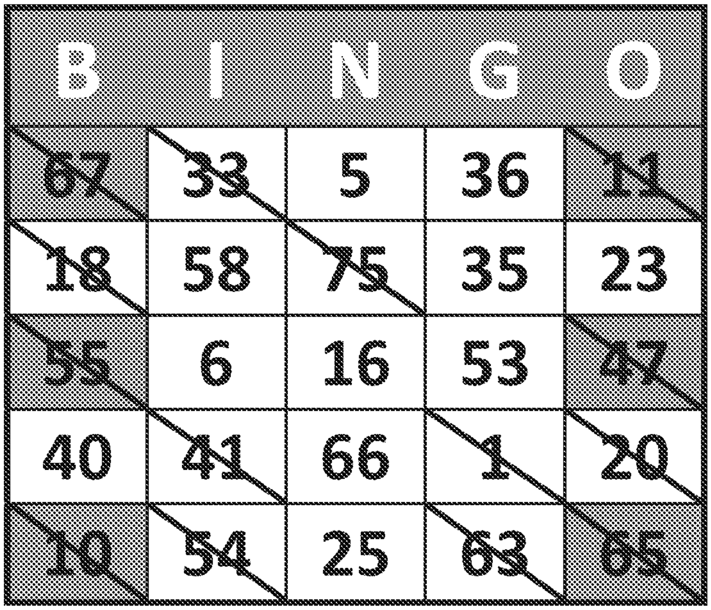
FIG. 9 is the virtual bingo card in FIG. 7 but marked with all balls from the ball draw in FIG. 8 whose indices fall within a game ending pattern ball count ('N'=9) or an interim prize pattern ball count ('M'=30).

Using this ball draw, the gaming machine 12 marks the player's bingo card as shown in FIG. 9 with all balls whose indices fall within the game ending pattern ball count ('N'=9) or the interim prize pattern ball count ('M'=30). Balls whose indices fall outside of the game ending pattern ball count ('N'=9) and the interim prize pattern ball count ('M'=30) are not marked. Using both the bingo card and the ball draw, the example indicates (i) the game ending pattern was not achieved within the first 9 balls ('N'=9), and (ii) the interim prize pattern was achieved within the first 30 balls ('M'=30). Specifically, the interim prize pattern was achieved with the $8^{th}$, $14^{th}$, $15^{th}$, $20^{th}$, $29^{th}$, and $30^{th}$ balls (i.e., balls at respective index values 8, 14, 15, 20, 29, and 30 in FIG. 8) of the ball draw. Therefore, the gaming machine 12 determines that the player is eligible to win an interim prize.

The gaming machine 12 calculates the resulting score of the interim prize winning pattern condition to be equal to the mathematical product of the indices of the balls within the ball draw that formed the interim prize pattern within 'M' balls, which in this case is $8 \times 14 \times 15 \times 20 \times 29 \times 30 = 29,232,000$. The gaming machine 12 then uses the interim prize score to determine the actual prize amount to be awarded to the player using a "score table" for the player's given buy-in option. The score tables for every buy-in option are made known to the player at the gaming machine 12 prior to the player's participation in any bingo game.

Each player purchasing a bingo card at a gaming machine 12 and receiving the 75 bingo balls has their card "evaluated" automatically by the gaming machine 12 on which they are playing, after all 75 balls have been received. Each player within the bingo game achieving the interim prize pattern conditions applicable to their buy-in option is awarded a prize which is determined by a combination of their buy-in option and any interim prize pattern's "score." Each player purchasing a bingo card and receiving the 75 bingo balls will have their card evaluated automatically by the electronic bingo machine on which they are playing. Each player within the bingo game achieving the interim prize pattern conditions will be awarded a prize which is determined by a combination of their buy-in option, and any interim prize pattern's score. The score is calculated by first forming a bit vector of length 75 (or the total number of balls 'M' used in a bingo game). The components of the bit vector will have a value of 1 at the corresponding indices of the balls that form the interim prize pattern and a value of 0 otherwise. The index of the lexicographical order of the bit vector will become the score of the pattern.

Figure 10:
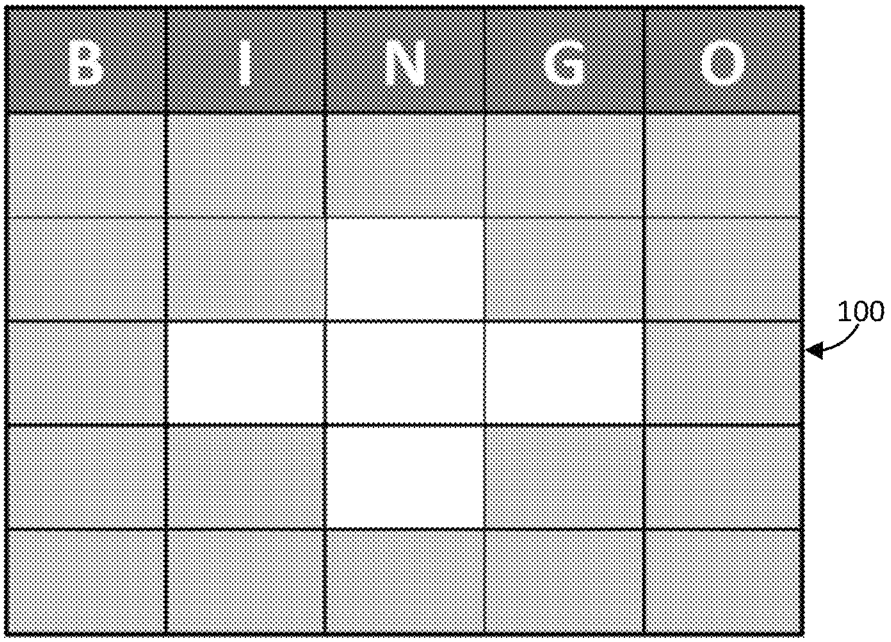
FIG. 10. is an example of another interim prize pattern generated by the bingo game manager that is different from the game ending pattern illustrated by FIG. 5.
Figure 11:
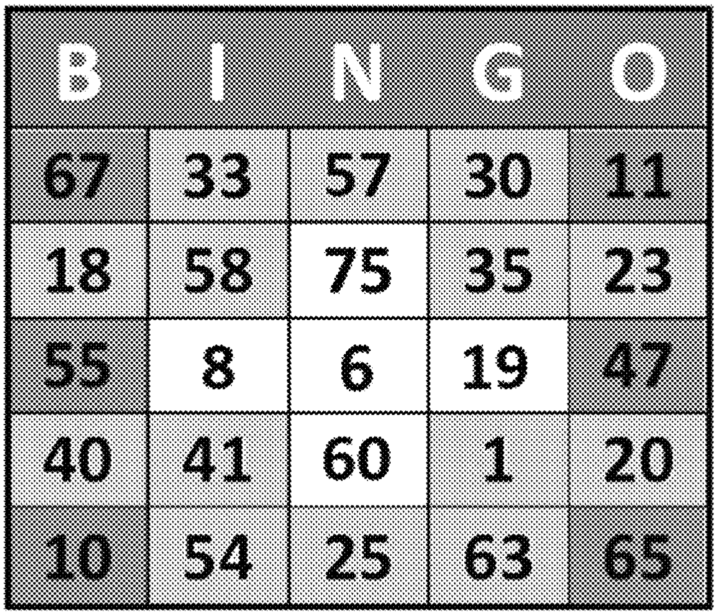
FIG. 11 is an example of a virtual bingo card generated by the bingo game manager and highlighting the spots representing the game ending pattern combined with the spots of the interim prize pattern.
Figure 12:
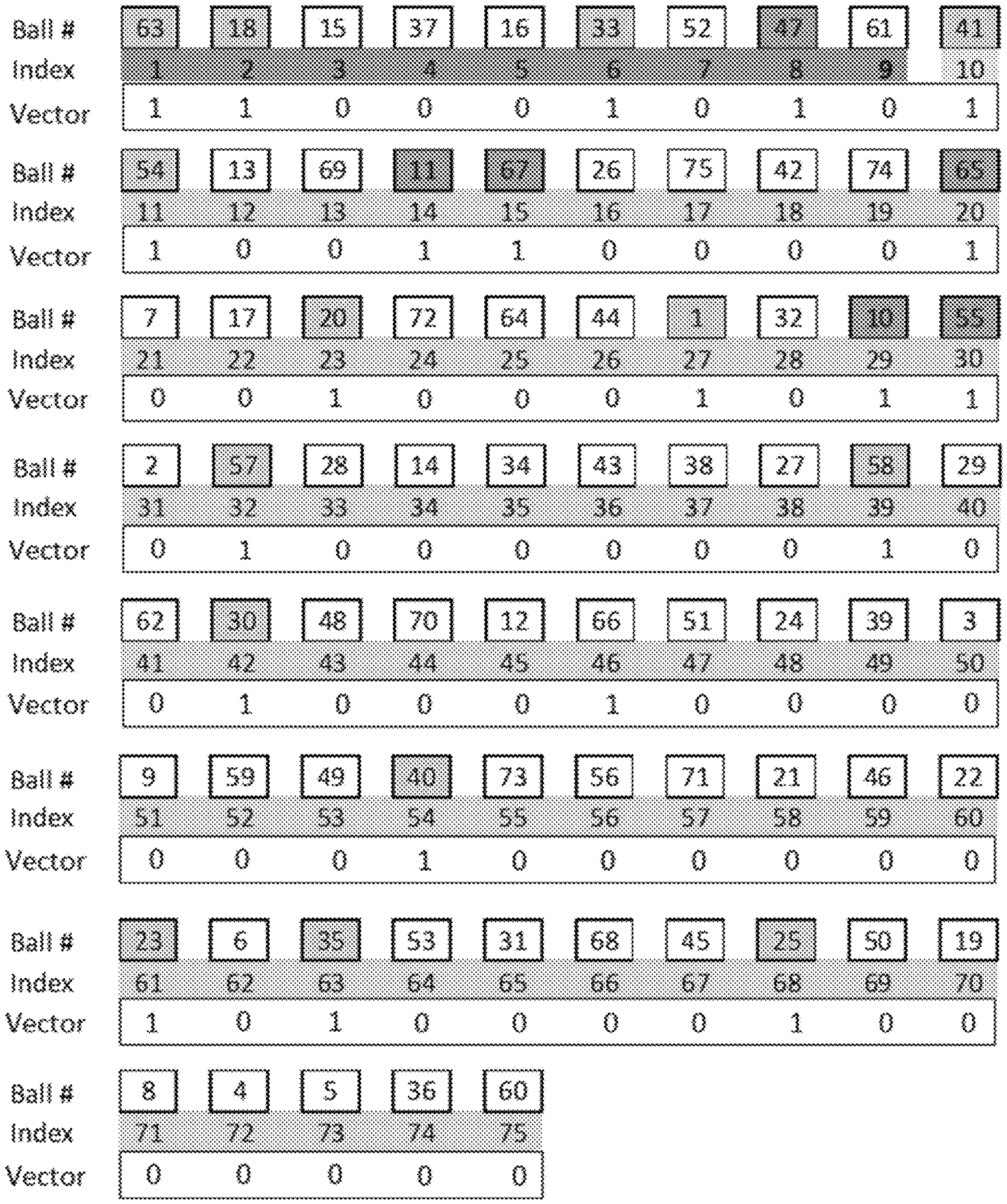
FIG. 12 is a diagram showing an example of a sequence of 75 balls randomly drawn by the bingo game manager for a bingo game using the virtual bingo card of FIG. 12.
Figure 14A:
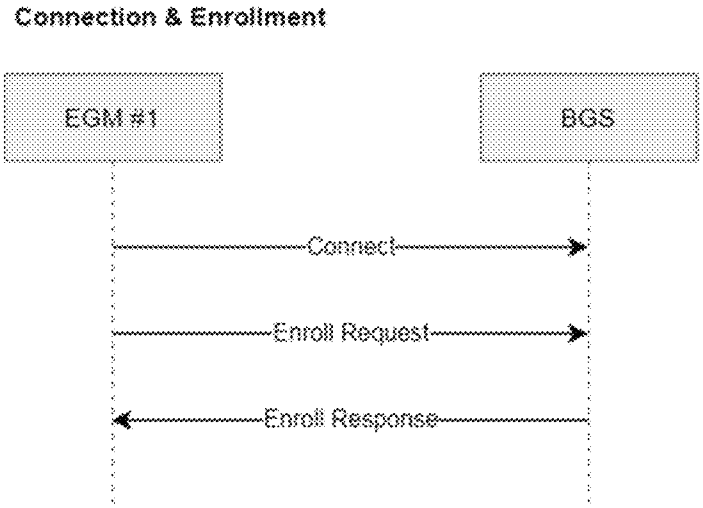
FIGS. 14A-E are message sequence diagrams for messages between the bingo game manager (BGS) and the electronic gaming machines (EGMs).
Figure 14B:
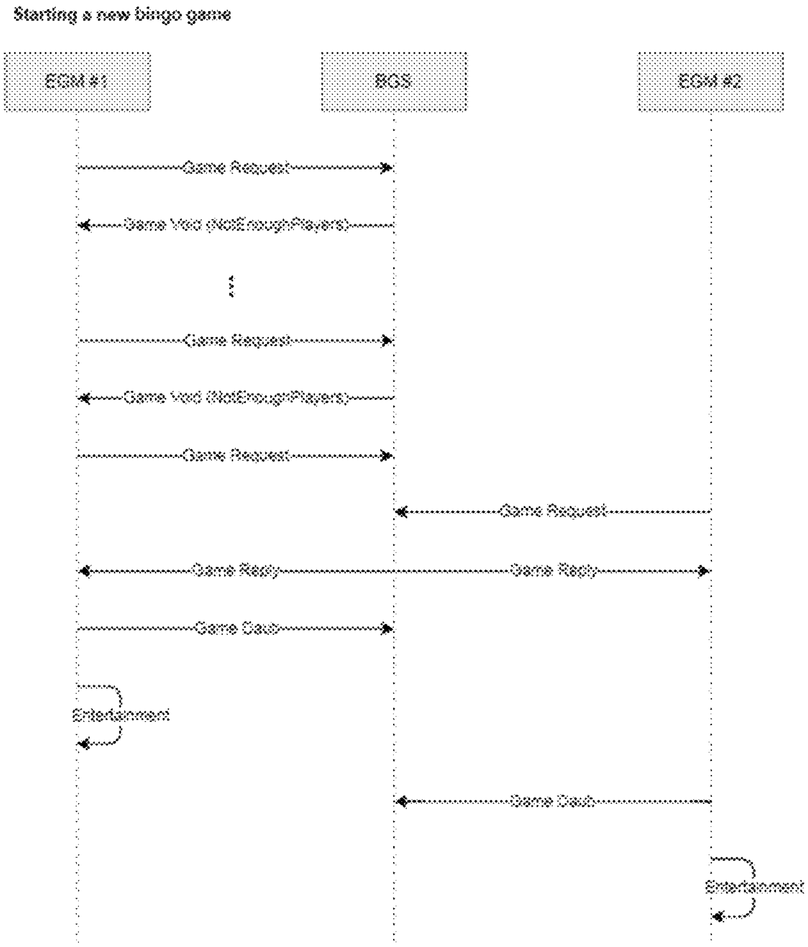
Figure 14C:
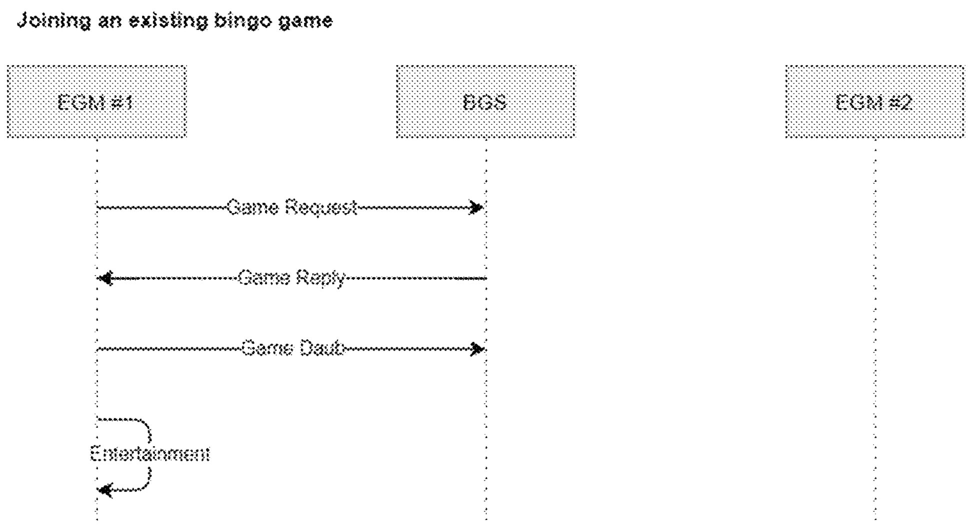
Figure 14D:
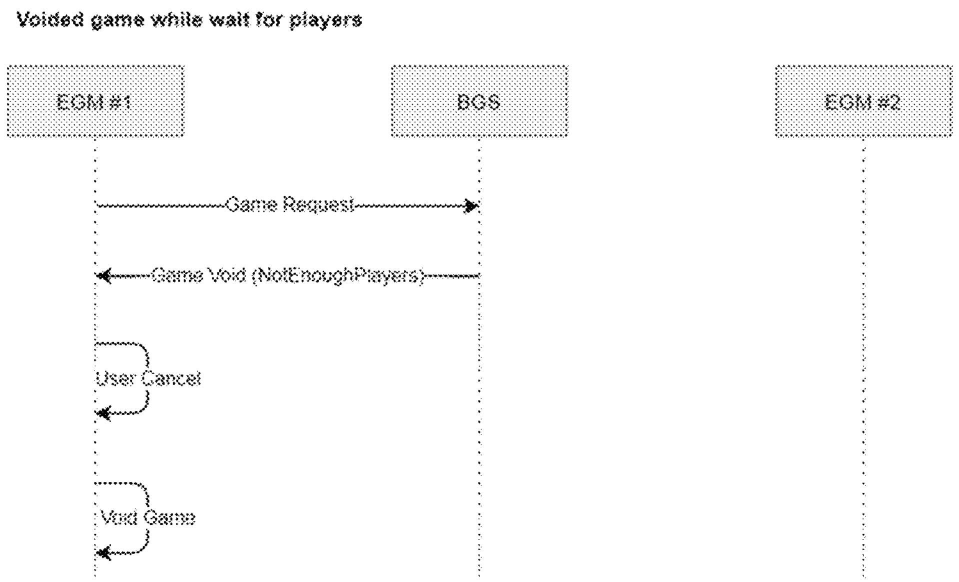
Figure 14E:
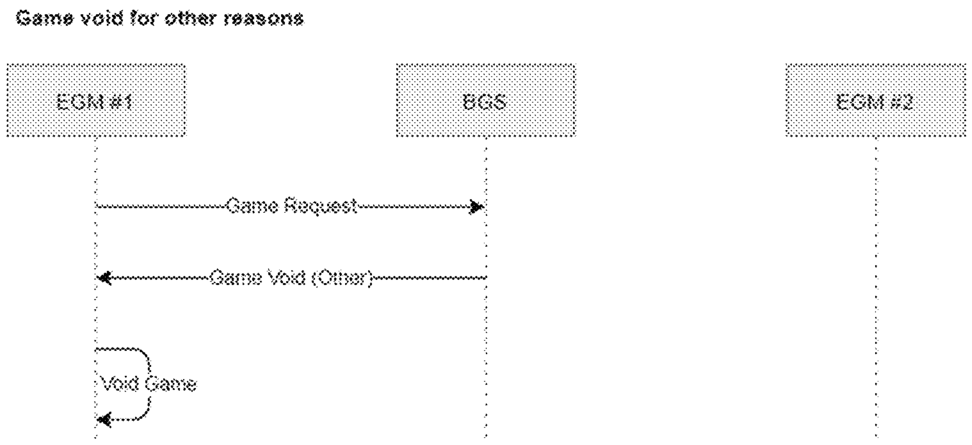

In another example, in accordance with one or more embodiments, a different scoring method is employed. A bingo game may have an 'N' value of 9, the game ending pattern shown in FIG. 5 and interim prize pattern shown in FIG. 10. For the bingo game, a player purchases the bingo card in FIG. 11 at a gaming machine 12, and the bingo game manager 10 randomly draws the 75 balls in the sequence shown in FIG. 12, wherein:

- Balls shown with an Index value in the range of 1 through 9 are balls which are within the game ending pattern ball count of 9 ('N'=9).
- Balls at respective Index values 8, 14, 15, 20, 29, and 30 are balls which match the game ending prize pattern.
- Balls at respective Index values 1, 2, 6, 8, 10, 11, 14, 15, 20, 23, 27, 29, 30, 32, 39, 42, 54, 61 and 68 are balls which appear on the player's bingo card within the interim prize pattern ball count of 75 ('M'=75), the total number of balls used in this example bingo game. As illustrated by FIG. 12, each drawn ball that contributed to achievement of the interim prize pattern has a corresponding bit value of 1 in the bit vector corresponding to the drawn ball's position in the random sequence. All other bits are set to 0. The resulting score for this interim prize pattern is 33,553,153,110,058,769 which is equal to the index of the lexicographical order of the bit vector 11000101011001100001001000101101000000010010-000000000010000001010000010000000. It is important to note that all possible ways of achieving the interim prize pattern within the 75 balls in the sequence in which they are received are uniquely identifiable by its score. Each score is associated with a zero, non-zero or a range of prizes. This score is then used to determine the actual prize amount to be awarded to the player using a score table for their given buy-in option. The score tables for every buy-in option are available to the player prior to the player's participation in any bingo game. Variations within the scope of the invention are possible. For example, balls contributing to achievement of the interim prize pattern may have their associated bit in the vector set to 0 with all other bits in the vector set to 1.

Figure 13:
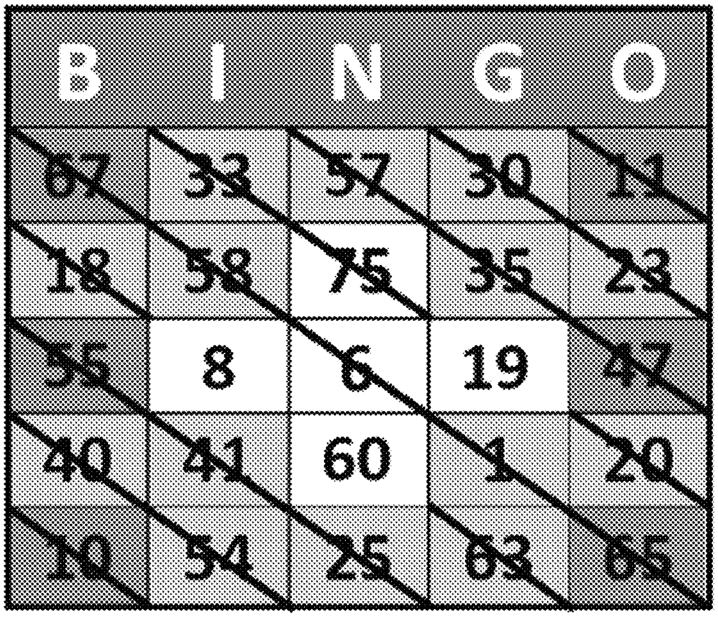
FIG. 13 is the virtual bingo card in FIG. 12 but marked with all balls from the ball draw in FIG. 13 whose indices fall within a game ending pattern ball count ('N'=9) or an interim prize pattern ball count ('M'=75).

Using this ball draw, the player's card is marked with all balls drawn before either the game ending pattern is achieved within the first "N" balls received or before the interim prize pattern is achieved, whichever comes first. The marking includes the last ball needed to complete the winning pattern. Once a winning outcome is achieved, no further spots are marked. The resulting card markings might look like the marked card shown in FIG. 13, which corresponds to an example of a ball draw illustrated by FIG. 12. Referring to both the bingo card (FIG. 13) and the ball draw (FIG. 12), it can be seen the game ending pattern was not achieved within the first 9 balls ('N'=9.) The interim prize pattern was achieved within the first 75 balls (since 'M'=75). The player is, thus, awarded an interim prize. Note that, depending on the score, the prize may actually be a losing outcome (i.e. the prize is zero or less than the wagered amount).

Different entertainment themes on different Class II electronic gaming machines 12 may have different buy-in options and different prizes available to the player.

Simultaneous Game Ending Pattern and Interim Prize Pattern Conditions

Depending on the values of 'N' and 'M', it is altogether possible for a player's bingo card to simultaneously achieve both the game ending pattern conditions (game ending pattern within the first 'N' of 75 balls) and the interim prize pattern conditions (interim prize pattern within the first 'M' of 75 balls.) Because the gaming machine 12 evaluates a player's bingo card after receiving all 75 bingo balls, the relative value of 'N' and 'M' do not affect the evaluation of one pattern condition over another. For example, the bingo card in FIG. 9 defines a value for 'M' (30) which is greater than the value of 'N' (9). With such configurations of 'N' and 'M', it is possible for a player to achieve both the game ending pattern conditions and the interim prize pattern conditions simultaneously. This can happen if the game ending pattern is achieved within the first 9 balls of the 75 balls received. By definition, this also means that the player achieved the interim prize pattern within the first 30 balls of the 75 balls received. In such a scenario, the interim prize will be determined and awarded; and the bingo game will be deemed completed.

Daubing Bingo

The default daubing operation is single-touch/single-tap. In a single-touch/single-tap mode, a gaming machine 12 participating in a bingo game sends a daub message to the bingo game manager 10 upon reception of the 75 balls for the bingo game from the bingo game manager 10. The contents of the daub message indicate whether the player achieved the interim pattern within the designated ball draw cutoff value of 'M'. The message may also include the interim prize amount to be awarded to the player.

Operators may have the option to configure for a multi-touch/double-tap mode. In this mode, a gaming machine 12 participating in a bingo game waits for the player to physically press a button or touch a screen element on the gaming machine 12 to simulate marking or "daubing" of their bingo card. Once the player performs this daubing operation, the gaming machine 12 sends a daub message to the bingo game manager 10 indicating whether the player achieved the interim pattern within the designated ball draw cutoff value of 'M'. The message may also include the interim prize amount to be awarded to the player.

Non-Concurrent Game Play

Because the bingo game manager 10 delivers all bingo balls for a bingo game to each player's gaming machine 12 in a single message, the bingo game manager 10 is free to handle player daubing in an asynchronous manner. For multi-touch/double-tap operation, this means that one player who fails to daub their bingo card will not "hold up" the bingo game play of all other players participating in the same bingo game. Player A may immediately daub their bingo card, determine any interim prize, notify the bingo game manager 10, and complete their game play; all while an inattentive Player B is not daubing their bingo card.

Messaging Between Bingo Game Manager and Gaming Machines

As visualized in the message sequence diagrams in FIGS. 14A-E, the bingo game system utilizes the following messages between the bingo game manager (BGS) 10 and the electronic gaming machines (EGMs) 12.

1) EGM-to-BGS initialization
   a) Connection
   b) Enroll Request (EGM→BGS)
      i) Sent by EGM to BGS when game first comes up
   c) Enroll Response (BGS→EGM)
      i) Sent by BGS to EGM to indicate state of enrollment
      ii) Included parameters
         (1) Game ending pattern
         (2) Game ending patter ball draw cutoff value of 'N'

2) Game play messages
  a) Game Request (EGM→BGS)
    i) Sent by EGM to BGS when player wants to start or join a bingo game
    ii) Included parameters
      (1) EGM-assigned game number (all future messages related to this bingo game will have same number)
      (2) Game's bet amount in credits
      (3) Game's ball draw cutoff value of 'M'
      (4) Game's interim prize pattern
  b) Game Reply (BGS→EGM)
    i) Sent by BGS to EGM, in response to a Game Request, when a bingo game for the player to start or join has been found
    ii) Included parameters
      (1) BGS-assigned game number (all future messages related to this game will have the same number)
      (2) EGM-assigned game number (the same number provided by EGM in Game Request)
      (3) Bingo card
      (4) 75 balls
  c) Game Daub (EGM→BGS)
    i) Sent by EGM to BGS, in response to a Game Reply, to indicate the player daub status
    ii) Included parameters
      (1) EGM-assigned game number (the same number provided by EGM in Game Request)
      (2) BGS-assigned game number (the same number provided by BGS in Game Reply)
      (3) Flag indicating player daubed within their allotted time
      (4) Interim pattern score
      (5) Interim prize won in credits
  d) Game Void (BGS→EGM)
    i) Sent by BGS to EGM if EGM should void the current wager or if not enough players have been found to start a new bingo game
    ii) Included parameters
      (1) EGM-assigned game number (the same number provided by EGM in Game Request)
      (2) BGS-assigned game number (the same number provided by BGS in Game Reply if the BGS void occurs after the Game Reply, otherwise 0)
      (3) Integer code specifying the reason for the void
      (4) Human-readable description of the void reason Advantages of the Bingo Game System The bingo game system disclosed herein offers a number of advantages over prior systems. The bingo game system has the capability of having variable ball draw cutoff values of 'M'. The value of 'M' for a particular bingo game may be selected so that the hit frequency of the bingo game closely matches the native hit frequency of the Class III theme on which the entertainment mechanism in Class II is based. As a result, the entertainment mechanism in Class II can mimic the look and feel of the Class III theme on which the entertainment mechanism is based. Further, the bingo game system uses a single interim prize pattern for players to "look for," thereby minimizing player confusion and overload that can occur in systems that use numerous winning patterns. In addition, the bingo game system avoids bingo ties by choosing to calculate theoretical bingo score probabilities without factoring in multiple players and tie scenarios. In addition, the bingo game system avoids bingo ties by ending the bingo game session after identifying the first player who hits the game ending pattern. Also, the bingo game system minimizes bingo game play time by having the bingo game manager 10 deliver all 75 balls to each player's gaming machine in one message and then processing player daubs asynchronously, without requiring other players in the same bingo game to wait. The bingo game system allows players to join existing bingo games that have not yet achieved their game ending patterns. By setting a game ending pattern to be a rare occurrence, the number of times that players may be faced with a "Waiting for Additional Players" message is reduced significantly.

In addition to the above advantages, in accordance with one or more embodiments, the scoring algorithm disclosed with reference to FIGS. 10-13 makes all bingo outcomes equally likely. This is most like a Class III game, in which the use of values from a random number generator, also all equally likely, are used to determine a game outcome and its presentation. The extremely large number of possible scores, thus, allows a score to be used as a seed to directly determine a presentation of a non-bingo game entertainment outcome. This method allows for the bingo game outcome to be determined at runtime, which is very fast and light compared to traditional solutions that depend on reverse mapping a scored prize amount to a limited subset of all possible Class III entertainment outcomes. The entertainment mechanism in such a Class II bingo machine may include a game engine that is much more like its related Class III game engine, resulting in the ability to more closely mimic the look and feel of very complicated Class III game features, for example, games including persistence or volatility picks. The method also allows for a model with precision that is native to the game's math definition. This mitigates mapping errors found in traditional Class II games that can result in unintentional changes to the player experience. This method allows precise mapping of the native hit frequency of the math model. In contrast, approximating hit frequency by changing the interim pattern ball count ('M'), as described above with reference to FIG. 6, can result in hit frequency shifts of more than 1% per shifted value of 'M'.

While the above embodiments have been described with reference to Class II and Class III gaming regulations, it should be understood that the claimed invention is applicable to any system and method intended to produce bingo outcomes that can be tied to entertainment outcomes that mimic the presentation of a non-bingo math model/game design. In this description, numerous specific details are set forth. However, it is understood that embodiments of the invention may be practiced without these specific details. In other instances, well-known circuits, structures and techniques have not been shown in detail in order not to obscure the understanding of this description. Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein. Each claim, as may be amended, constitutes an embodiment of the invention, incorporated by reference into the detailed description. Moreover, in this description, the phrase "exemplary embodiment" means that the embodiment being referred to serves as an example or illustration.

Each of these embodiments and obvious variations thereof is contemplated as falling within the spirit and scope of the claimed invention, which is set forth in the following claims. Moreover, the present concepts expressly include any and all combinations and subcombinations of the preceding elements and aspects.

What is claimed is:

1. A method of operating a bingo game, the bingo game including a game ending pattern and an interim prize pattern, the game ending pattern and the interim prize pattern each being common pattern of spots on all bingo cards purchased in the bingo game, the method comprising the operations of:

accepting, via a value input device of each of a plurality of electronic gaming machines, a physical item associated with a monetary value to establish a credit balance at the respective gaming machine;

receiving, at each of one or more purchasing machines of the plurality of gaming machines, an input indicative of a purchase of a virtual bingo card, the purchase being drawn from the credit balance at the respective purchasing machine;

randomly generating, by a bingo game manager in communication with the plurality of gaming machines, a common ball draw comprising a random sequence of numbered virtual balls;

randomly generating, by the bingo game manager, the purchased bingo cards such that none of the bingo cards are duplicates of each other;

delivering the common ball draw and the respective bingo card in at least one message from the bingo game manager to each of the one or more purchasing machines;

in response to the interim prize pattern being achieved on the respective bingo card at any of the one or more purchasing machines, generating, by the purchasing machine, a score based on indices of the balls within the common ball draw that correspond to a spot in the interim prize pattern, the score used by the purchasing machine to directly determine a non-bingo entertainment outcome without reverse mapping; and animating, by the purchasing machine, the non-bingo entertainment outcome;

in response to the game ending pattern being achieved, at any of the one or more purchasing machines, on the respective bingo card within 'N' number of balls of the ball draw, the bingo game manager ending the bingo game; and in response to the game ending pattern not being achieved, at the one or more purchasing machines, on the respective bingo cards within the 'N' number of balls of the ball draw, enabling, by the bingo game manager, any of the plurality of gaming machines to join the bingo game in progress by receiving an input indicative of a purchase of a new bingo card at the respective gaming machine.

2. The method of claim 1, wherein the ball draw includes 75 balls numbered from 1 to 75.

3. The method of claim 1, wherein the number of spots in the game ending pattern is six.

4. The method of claim 1, wherein a value of 'N' is common to the one or more purchasing machines.

5. The method of claim 1, further including processing, by the bingo game manager, player daubs received at each of the one or more purchasing machines asynchronously relative to player daubs received at other ones of the one or more purchasing machines.

6. The method of claim 1, wherein the score comprises a bit vector having a bit value set at each bit vector position that corresponds to a position, in the random sequence, of any ball contributing to the achievement of the interim prize pattern.

7. The method of claim 1, further including awarding, by the purchasing machine using a score table for the player's buy-in option, an award amount associated with the score.

8. A method of operating a bingo game, the bingo game including a game ending pattern and an interim prize pattern, the game ending pattern and the interim prize pattern each being common patterns of spots on all bingo cards purchased in the bingo game, the method comprising the operations of:

accepting, via a value input device of each of a plurality of electronic gaming machines, a physical item associated with a monetary value to establish a credit balance at the respective gaming machine;

receiving, at each of one or more purchasing machines of the plurality of gaming machines, an input indicative of a purchase of a virtual bingo card, the purchase being drawn from the credit balance at the respective purchasing machine;

randomly generating, by a bingo game manager in communication with the plurality of gaming machines, a common ball draw comprising a random sequence of numbered virtual balls;

randomly generating, by the bingo game manager, the purchased bingo cards such that none of the bingo cards are duplicates of each other;

delivering the common ball draw and the respective bingo card in at least one message from the bingo game manager to each of the one or more purchasing machines;

in response to the interim prize pattern being achieved on the respective bingo card at any of the one or more purchasing machines, generating, by the purchasing machine, a score determined by a bit vector, the generating comprising setting a bit value at each bit vector position that corresponds to a position, in the random sequence, of any ball contributing to the achievement of the interim prize pattern; and animating, by the purchasing machine, a non-bingo entertainment outcome directly based on the score without reverse mapping;

in response to the game ending pattern being achieved, at any of the one or more purchasing machines, on the respective bingo card within 'N' number of balls of the ball draw, the bingo game manager ending the bingo game; and in response to the game ending pattern not being achieved, at the one or more purchasing machines, on the respective bingo cards within the 'N" number of balls of the ball draw, enabling, by the bingo game manager, any of the plurality of gaming machines to join the bingo game in progress by receiving an input indicative of a purchase of a new bingo card at the respective gaming machine.

9. The method of claim 8, wherein the ball draw includes 75 balls numbered from 1 to 75.

10. The method of claim 8, wherein a value of 'N' is common to the one or more purchasing machines.

11. The method of claim 8, wherein setting the bit value comprises setting the bit value to 1.

12. The method of claim 8, wherein setting the bit value comprises setting the bit value to 0.

13. The method of claim 8, further including processing, by the bingo game manager, player daubs received at each of the one or more purchasing machines asynchronously relative to player daubs received at other ones of the one or more purchasing machines.

14. The method of claim 8, further including awarding, by the purchasing machine using a score table for the player's buy-in option, an award amount associated with the score.

15. A method of operating a bingo game, the bingo game including a game ending pattern and an interim prize pattern, the game ending pattern and the interim prize pattern each being common patterns of spots on all bingo cards purchased in the bingo game, the method comprising the operations of:

accepting, via a value input device of each of a plurality of electronic gaming machines, a physical item associated with a monetary value to establish a credit balance at the respective gaming machine;

receiving, at each of one or more purchasing machines of the plurality of gaming machines, an input indicative of a purchase of a virtual bingo card, the purchase being drawn from the credit balance at the respective purchasing machine;

randomly generating, by a bingo game manager in communication with the plurality of gaming machines, a common ball draw comprising a random sequence of numbered virtual balls;

randomly generating, by the bingo game manager, the purchased bingo cards such that none of the bingo cards are duplicates of each other;

delivering the common ball draw and the respective bingo card in at least one message from the bingo game manager to each of the one or more purchasing machines;

in response to the interim prize pattern being achieved on the respective bingo card within 'M' number of balls at any of the one or more purchasing machines, generating, by the purchasing machine, a score based on indices of the balls within the common ball draw that correspond to a spot in the interim prize pattern, the score used, at least in part, by the purchasing machine to determine a non-bingo entertainment outcome without reverse mapping to a stored non-bingo entertainment outcome; and animating, by the purchasing machine, the non-bingo entertainment outcome;

in response to the game ending pattern being achieved, at any of the one or more purchasing machines, on the respective bingo card within 'N' number of balls of the ball draw, the bingo game manager ending the bingo game; and in response to the game ending pattern not being achieved, at the one or more purchasing machines, on the respective bingo cards within the 'N" number of balls of the ball draw, enabling, by the bingo game manager, any of the plurality of gaming machines to join the bingo game in progress by receiving an input indicative of a purchase of a new bingo card at the respective gaming machine.

16. The method of claim 15, wherein the score comprises a bit vector having a bit value set at each bit vector position that corresponds to a position, in the random sequence, of any ball contributing to the achievement of the interim prize pattern.

17. The method of claim 15, wherein the ball draw includes 75 balls numbered from 1 to 75.

18. The method of claim 15, wherein a value of 'N' is common to the one or more purchasing machines.

19. The method of claim 15, wherein a value of 'M' is common to the one or more purchasing machines.

20. The method of claim 19, wherein the values of 'N' and 'M' are different.

21. The method of claim 15, further including processing, by the bingo game manager, player daubs received at each of the one or more purchasing machines asynchronously relative to player daubs received at other ones of the one or more purchasing machines.

22. The method of claim 15, further including awarding, by the purchasing machine using a score table for the player's buy-in option, an award amount associated with the score.

23. The method of claim 15, wherein the game ending pattern is different than the interim prize pattern.

* * * * *